(No Model.)

F. A. SWAN.
ANGULAR PIPE SECTION.

No. 534,021. Patented Feb. 12, 1895.

WITNESSES.
Matthew M. Blunt
H. A. Chase.

INVENTOR.
Frederick A. Swan
by Jas. H. Churchill
ATT'Y.

UNITED STATES PATENT OFFICE.

FREDERICK A. SWAN, OF BOSTON, MASSACHUSETTS.

ANGULAR PIPE-SECTION.

SPECIFICATION forming part of Letters Patent No. 534,021, dated February 12, 1895.

Application filed August 8, 1894. Serial No. 519,750. (No model.)

*To all whom it may concern:*

Be it known that I, FREDERICK A. SWAN, residing in Boston, in the county of Suffolk and State of Massachusetts, have invented an Improvement in Angular Pipe-Sections, of which the following description, in connection with the accompanying drawings, is a specification, like letters and figures on the drawings representing like parts.

This invention relates to an angular pipe section or elbow coupling especially adapted, among other things, to be used as a part of a conduit system for carrying insulated conductors or wires.

My present invention has for its object to provide an angular pipe section or elbow coupling with one or more antifriction devices within it, at or about the point of junction of the two members comprising the pipe section, whereby an insulated wire or other article of similar form, may be carried through and around the bend in the pipe section with a minimum amount of friction, thereby avoiding the injurious cutting action upon the insulation of the wire, and enabling a wire or conductor to be carried through a conduit having a maximum number of joints or angular turns.

The antifriction device within the angular pipe section may and preferably will be made in the form of a drum, sleeve or roller loosely mounted upon a shaft or arbor carried by the pipe section, as will be described.

The angular pipe section or elbow coupling may and preferably will be provided with an enlargement for the reception of the antifriction roller or device between the two members of the pipe section, for a purpose as will be described.

These and other features of this invention will be pointed out in the claims at the end of this specification.

Figure 1:
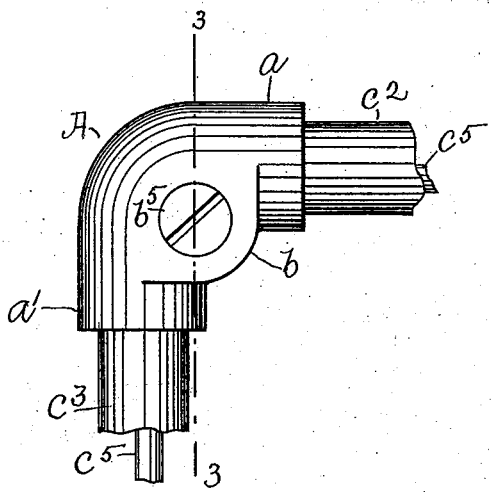
Figure 2:
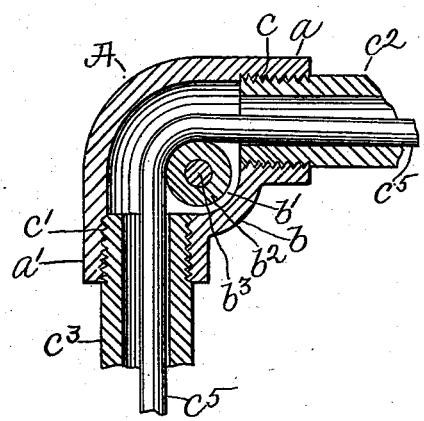
Figure 3:
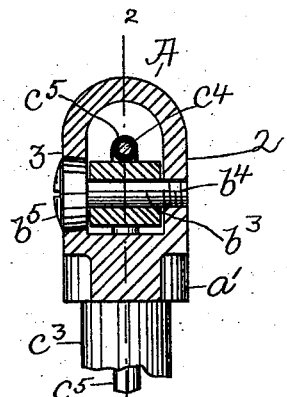

Figure 1 is a side elevation of an angular pipe section or elbow coupling embodying this invention and two sections of pipe connected therewith, to enable this invention to be understood; Fig. 2, a vertical longitudinal section of the angular pipe section and the pipes connected therewith shown in Fig. 1, the section being taken on the line 2—2, Fig. 3, the conductor or wire extended through the angular pipe section being shown in elevation, and Fig. 3, a transverse section on the line 3—3, Fig. 1 looking toward the left.

Referring to Fig. 1, A represents an angular pipe section, or as it is commonly termed an elbow coupling, embodying this invention, the said section or elbow coupling comprising two members $a$ $a'$ extended substantially at right angles to each other and cast integral with each other.

In accordance with this invention, the angular pipe section or elbow coupling A, is provided within it with one or more antifriction devices, which may and preferably will be made as herein shown, and the said angular pipe section or coupling is preferably provided between the members $a$ $a'$ with an enlargement $b$ forming a chamber $b'$ for the reception of the antifriction device or devices. The antifriction device referred to, may and preferably will be made as herein shown, it consisting of a drum, sleeve or hollow roller $b^2$ loosely mounted upon a shaft or arbor $b^3$ (see Fig. 3), which in the present instance is shown as provided with screw threads $b^4$ at one end, and with an enlarged screw-head $b^5$ at the opposite end, the screw threaded end $b^4$ of the shaft or arbor $b^3$ being fitted into a threaded socket in one wall as 2 of the pipe section, and the enlarged screw head $b^5$ being shown as beveled to fit a beveled socket or opening in the opposite wall 3 of the said pipe section.

The members $a$ $a'$ may and preferably will be provided with screw threads $c$ $c'$ to engage the threaded end of pipes $c^2$ $c^3$, which may form part of a pipe system or conduit for carrying one or more electrical conductors, and especially insulated electrical conductors or wires.

In the present instance, I have represented but one conductor, which may, for the purpose of this invention, be regarded as an insulated wire consisting of a metallic conductor $c^4$ having a covering $c^5$ of insulating material. The insulated conductor, in accordance with this invention, passes from one pipe as $c^2$ to the other pipe as $c^3$ over the antifriction roller $b^2$, and by reason of the angular pipe connection or elbow coupling being provided with an antifriction roller or device over which the conductor passes, where it bends, the insulated wire may be drawn from the pipe $c^2$ into the pipe $c^3$, and danger of abrading or otherwise injuring the insulation on the wire is avoided, which is of great advantage in a conduit system for carrying electric wires, and more especially in what is termed as an interior conduit system, such as is employed in the wiring of buildings, for by reason of this invention, the conductor or wire may be carried through a conduit or pipe having a substantially large number of bends or joints.

The angular pipe section or elbow coupling is preferably provided with an enlargement $b$, so that the inner diameter of the pipes $c^2$ $c^3$ connected to the members $a$ $a'$ of the said elbow, may be substantially tangent to the periphery of the antifriction roll.

Furthermore, by means of the angular pipe section or elbow coupling being provided with an antifriction device, as described, substantially small elbows or turns may be employed, thereby enabling the pipes of the conduit system to be carried close to the walls of a room and avoiding the necessity of unsightly large bends being made in the pipes at the corners of the room, which in conduit systems as now constructed and known to me are necessary, in order to permit the conductor or wire in the pipes to be carried around the corners or bends from one pipe section to another.

I claim—

1. As a new article of manufacture, an angular pipe section or elbow coupling provided within it with an antifriction device, for the purpose specified.

2. As a new article of manufacture, an angular pipe section or elbow coupling comprising two members at an angle to each other, and an antifriction device loosely mounted within the said angular pipe section, for the purpose specified.

3. As an improved article of manufacture, an angular pipe section or elbow coupling comprising two members at an angle to each other and provided with an enlargement between the said members, and an antifriction roller or device located in said enlargement within the said angular pipe section, substantially as described.

4. The combination with two pipes at an angle to each other, of an angular pipe section or elbow coupling joining said pipes, and an antifriction device in said pipe section or elbow coupling, substantially as described.

In testimony whereof I have signed my name to this specification in the presence of two subscribing witnesses.

FREDERICK A. SWAN.

Witnesses:
JAS. H. CHURCHILL,
J. MURPHY.